US012647897B2

(12) United States Patent
Chen et al.

(10) Patent No.: US 12,647,897 B2
(45) Date of Patent: Jun. 2, 2026

(54) APPARATUS AND METHOD FOR DYNAMIC DATA PLANE LAYER 2 CLOCK FREQUENCY/VOLTAGE ADJUSTMENT

(71) Applicant: Nokia Technologies Oy, Espoo (FI)

(72) Inventors: Na Chen, San Diego, CA (US); Su-Lin Low, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 276 days.

(21) Appl. No.: 18/574,565

(22) PCT Filed: Jan. 6, 2023

(86) PCT No.: PCT/US2023/010325
§ 371 (c)(1),
(2) Date: Dec. 27, 2023

(87) PCT Pub. No.: WO2024/147793
PCT Pub. Date: Jul. 11, 2024

(65) Prior Publication Data
US 2024/0349196 A1     Oct. 17, 2024

(51) Int. Cl.
*H04W 52/02* (2009.01)
*H04W 80/02* (2009.01)
(52) U.S. Cl.
CPC ........ *H04W 52/0287* (2013.01); *H04W 80/02* (2013.01)
(58) Field of Classification Search
None
See application file for complete search history.

(56) References Cited

U.S. PATENT DOCUMENTS

| | | | |
|---|---|---|---|
| 2005/0024927 A1 | 2/2005 | Dolwin | |
| 2009/0135752 A1 | 5/2009 | Su | |

(Continued)

FOREIGN PATENT DOCUMENTS

| | | | |
|---|---|---|---|
| EP | 2804413 A1 | 11/2014 | |

OTHER PUBLICATIONS

Bolla et al., "Dynamic Voltage and Frequency Scaling in Parallel Network Processors", 2012 IEEE 13th International Conference on High Performance Switching and Routing, pp. 242-249, Downloaded on: Mar. 23, 2023 (Mar. 23, 2023), Date on publlication: Aug. 6, 2012, (Aug. 6, 2012), entire document, 8 pages.

(Continued)

*Primary Examiner* — Angela Nguyen
(74) *Attorney, Agent, or Firm* — McCarter & English LLP

(57) ABSTRACT

According to one aspect of the present disclosure, a baseband chip is provided. The baseband chip may include a data plane (DP) subsystem. The DP subsystem may include a DP clock generation unit. The DP clock generation unit may set a frequency level for the DP subsystem. The DP subsystem may include a DP power control unit. The DP power control unit may set a voltage level for the DP subsystem. The DP subsystem may include a microcontroller (uC) cluster. The uC cluster may include a DP frequency/voltage selection component. The DP frequency/voltage selection component may determine a frequency-level adjustment and a voltage-level adjustment associated with a slot based on a set of inputs. The DP frequency/voltage selection component may configure the DP clock generation unit with the frequency-level adjustment. The DP frequency/voltage selection component may configure the DP power control unit with the voltage-level adjustment.

20 Claims, 9 Drawing Sheets

110

(56)                References Cited

U.S. PATENT DOCUMENTS

| 2013/0195116 A1* | 8/2013 | Thorburn | .......... H02J 13/00002 |
| | | | 370/458 |
| 2017/0359784 A1* | 12/2017 | Kumar | .................. H03F 1/0227 |
| 2020/0127942 A1 | 4/2020 | Isloorkar | |
| 2022/0022145 A1* | 1/2022 | Raghavan | ......... H04W 72/0453 |

OTHER PUBLICATIONS

International Search Report in the international application No. PCT/US2023/010325, mailed on May 10, 2023, 2 pages.
Written Opinion of the International Search Authority in the international application No. PCT/US2023/010325, mailed on May 10, 2023, 8 pages.

* cited by examiner

<u>100</u>

<u>MAC PDU scheduled UL transmission – K2 >=1 slots away</u>

$$\left\lceil n \cdot \frac{2^{\mu PUSCH}}{2^{\mu PDCCH}} \right\rceil + K_2$$

<u>110</u>

<u>MAC PDU scheduled UL transmission – K2 < 1 - Same Slot</u>

$$T_{proc,2} = \max\left((N_2 + d_{2,1})(2048 + 144) \cdot k2^{-\mu} \cdot T_c, d_{2,2}\right)$$

200

300

900

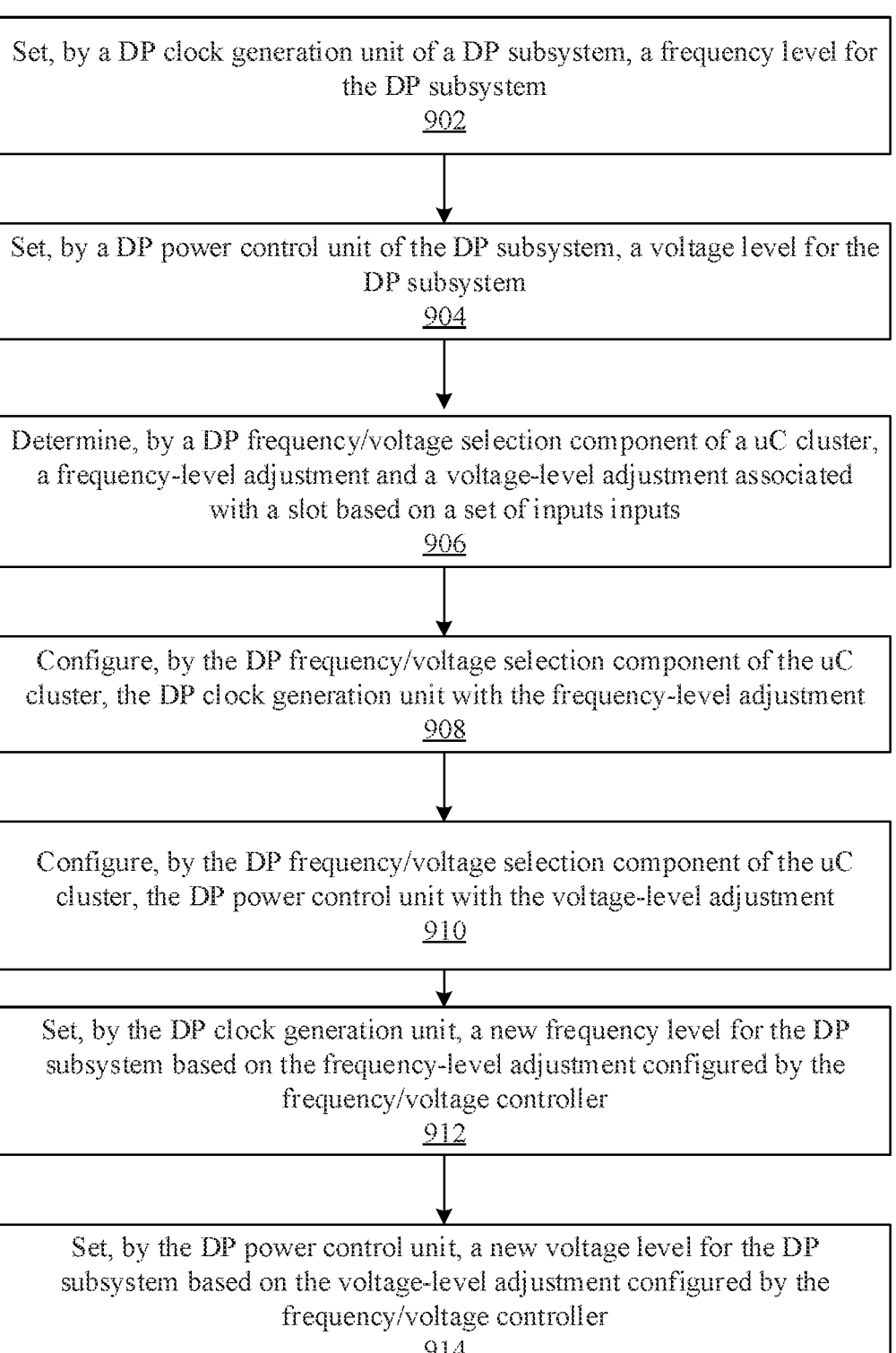

Set, by a DP clock generation unit of a DP subsystem, a frequency level for the DP subsystem
902

Set, by a DP power control unit of the DP subsystem, a voltage level for the DP subsystem
904

Determine, by a DP frequency/voltage selection component of a uC cluster, a frequency-level adjustment and a voltage-level adjustment associated with a slot based on a set of inputs inputs
906

Configure, by the DP frequency/voltage selection component of the uC cluster, the DP clock generation unit with the frequency-level adjustment
908

Configure, by the DP frequency/voltage selection component of the uC cluster, the DP power control unit with the voltage-level adjustment
910

Set, by the DP clock generation unit, a new frequency level for the DP subsystem based on the frequency-level adjustment configured by the frequency/voltage controller
912

Set, by the DP power control unit, a new voltage level for the DP subsystem based on the voltage-level adjustment configured by the frequency/voltage controller
914

FIG. 9

APPARATUS AND METHOD FOR DYNAMIC DATA PLANE LAYER 2 CLOCK FREQUENCY/VOLTAGE ADJUSTMENT

CROSS-REFERENCE TO RELATED APPLICATIONS

This application is a national stage application of International Application No. PCT/US2023/010325, filed on Jan. 6, 2023, which is incorporated herein by reference in its entirety.

BACKGROUND

Embodiments of the present disclosure relate to apparatus and method for wireless communication.

Wireless communication systems are widely deployed to provide various telecommunication services such as telephony, video, data, messaging, and broadcasts. In cellular communication, such as the 4th-generation (4G) Long Term Evolution (LTE) and the 5th-generation (5G) New Radio (NR), the 3rd Generation Partnership Project (3GPP) defines various procedures for data plane (DP) clock frequency/voltage selection.

SUMMARY

According to one aspect of the present disclosure, a baseband chip is provided. The baseband chip may include a data plane (DP) subsystem. The DP subsystem may include a DP clock generation unit configured to set a frequency level for the DP subsystem. The DP subsystem may include a DP power control unit configured to set a voltage level for the DP subsystem. The DP subsystem may include a microcontroller uC cluster. The uC cluster may include a DP frequency/voltage selection component. The DP frequency/voltage selection component may be configured to determine a frequency-level adjustment and a voltage-level adjustment associated with a slot based on a set of inputs. The DP frequency/voltage selection component may be configured to configure the DP clock generation unit with the frequency-level adjustment. The DP frequency/voltage selection component may be configured to configure the DP power control unit with the voltage-level adjustment.

According to another aspect of the present disclosure, an apparatus for wireless communication of a UE is provided. The UE may include a baseband chip. The baseband chip may include a DP subsystem. The DP subsystem may include a DP clock generation unit configured to set a frequency level for the DP subsystem. The DP subsystem may include a DP power control unit configured to set a voltage level for the DP subsystem. The DP subsystem may include a uC cluster. The uC cluster may include a DP frequency/voltage selection component. The DP frequency/voltage selection component may be configured to determine a frequency-level adjustment and a voltage-level adjustment associated with a slot based on a set of inputs. The DP frequency/voltage selection component may be configured to configure the DP clock generation unit with the frequency-level adjustment. The DP frequency/voltage selection component may be configured to configure the DP power control unit with the voltage-level adjustment.

According to yet another aspect of the present disclosure, a method of wireless communication of a baseband chip is provided. The method may include setting, by a DP clock generation unit of a DP subsystem, a frequency level for the DP subsystem. The method may include setting, by a DP power control unit of the DP subsystem, a voltage level for the DP subsystem. The method may include determining, by a DP frequency/voltage selection component of a uC cluster, a frequency-level adjustment and a voltage-level adjustment associated with a slot based on a set of inputs, the uC cluster being part of the DP subsystem. The method may include configuring, by the DP frequency/voltage selection component of the uC cluster, the DP clock generation unit with the frequency-level adjustment. The method may include configuring, by the DP frequency/voltage selection component of the uC cluster, the DP power control unit with the voltage-level adjustment.

These illustrative embodiments are mentioned not to limit or define the present disclosure, but to provide examples to aid understanding thereof. Additional embodiments are discussed in the Detailed Description, and further description is provided there.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 9 is a flowchart of a second exemplary method of wireless communication, according to some embodiments of the present disclosure.

Figure 1A:
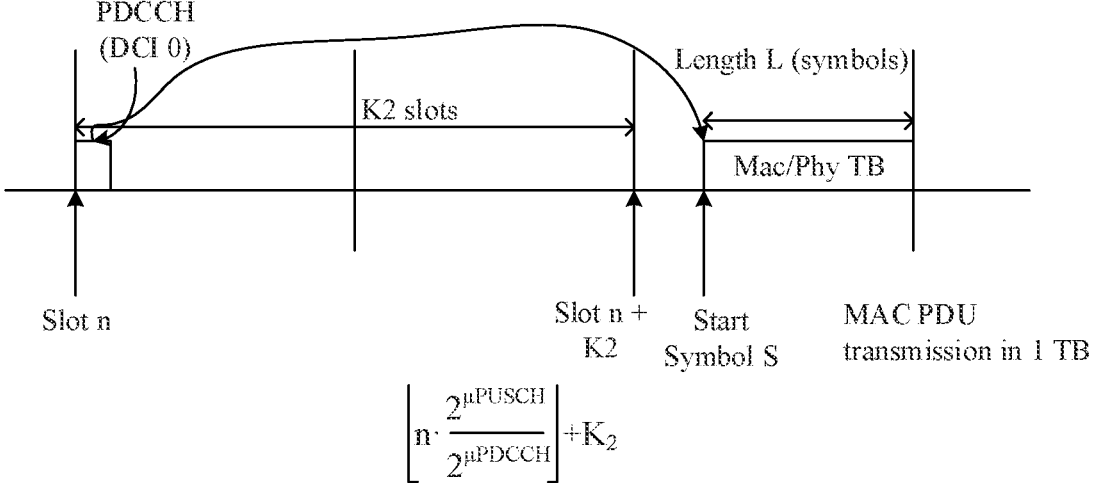
FIG. 1A illustrates a first example timing diagram used to schedule a UL medium access control (MAC) protocol data unit (PDU).

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a." "an." or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, wireless local area network (WLAN) system, and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as the Global System for Mobile Communications (GSM). An OFDMA network may implement a RAT, such as LTE or NR. A WLAN system may implement a RAT, such as Wi-Fi. The techniques described herein may be used for the wireless networks and RATs mentioned above, as well as other wireless networks and RATs.

An important consideration of wireless communication relates to data rates, especially with the increased use of media streaming services. Carrier aggregation (CA) is one technique used in wireless communication to increase the data rate per user, whereby multiple frequency blocks (also referred to herein as "component carriers") are assigned to the same UE for concurrent transmission using different parts of the frequency spectrum. Each component carrier (CC) may be associated with a different cell, e.g., base station. The maximum possible data rate per user is increased as the number of component carriers (CCs) assigned to a UE increases. CA also increases the sum data rate of a cell due to enhanced resource utilization and spectral efficiency.

While communicating using CA, a UE may be connected with two or more media access control (MAC) entities, which are each connected to a base station with multiple carriers of different bandwidths, a different number of available resources, and different radio channel conditions. To schedule the transmission of uplink (UL) data packets using CA, the UE receives multiple UL grants concurrently from different base stations. Each UL grant may schedule a different logical channel packet transmission on its respective CC.

Figure 1B:
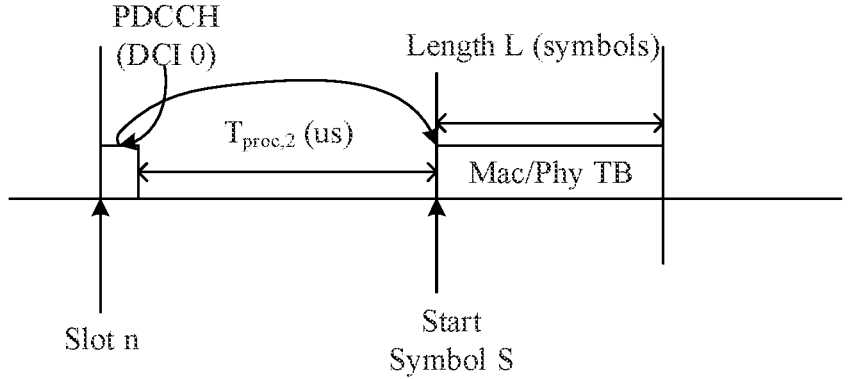
FIG. 1B illustrates a second example timing diagram that may be used to schedule a MAC PDU.

A base station may send a UL grant to the UE using the physical downlink control channel (PDCCH) of that CC. The UE may receive the UL grant at the beginning of a slot (in a downlink control indicator (DCI)), which indicates the time at which the associated MAC PDU is scheduled for transmission. The UL grant may also indicate the number of resources (e.g., byte size) that have been allocated for the MAC PDU. The scheduled time may be equivalent to a time delay of K2 slot(s) from the slot in which the UL grant is received. FIG. 1A illustrates a first example timing diagram 100 in which K2 may be one or more slots away from the received UL grant, with a transmission start symbol at the slot boundary. FIG. 1B illustrates a second example timing diagram 110 in which K2 is less than one, meaning the transmission start symbol S is in the same slot in which the UL grant is received. A UL grant that schedules a MAC PDU transmission in the same slot in which the grant was received indicates that the MAC PDU may be associated with a low-latency application, and hence, the UE may need to process the MAC PDU within milliseconds or microseconds.

The scheduling mechanism described above may apply to each CC, and hence, the UE may process MAC PDUs for multiple CCs concurrently. One challenge of Layer 2 DP packet processing relates to the unoptimized power consumption caused by clock frequency and the supply voltage selected to support applications with different data rates and latency requirements, which may be further exacerbated under different channel conditions. For example, in some systems, the operating clock frequency and voltage are selected solely on the static cell configuration information (e.g., bandwidth size) and reselected only when the cell configuration changes (e.g., when the bandwidth size changes). These systems suffer from, among others, non-optimized power consumption for data applications with time-varying data-rates and the risk of not meeting timing constraints for low-latency applications, e.g., such as ultra-reliable low-latency communication (URLLC).

Thus, there exists an unmet need for a DP clock frequency/voltage selection technique to optimize Layer 2 DP power consumption based on static and semi-static parameters associated with wireless communication.

To overcome these and other challenges, the present disclosure provides an exemplary clock frequency/voltage adjustment technique that dynamically adjusts clock frequency and voltage for slot-data rate and packet-size variation, as well as for different latency-tolerance requirements to achieve power optimization. For example, the baseband chip of the present disclosure may include an exemplary frequency/voltage selection component as part of DP sub-system microcontroller (uC). The exemplary frequency/voltage selection component may dynamically determine the frequency and voltage levels according to 1) slot-data rate (e.g., maximum throughput per slot/CC), 2) average-packet size (e.g., based on the grant indication), and 3) latency requirements (e.g., the physical layer (PHY) due time and/or K2), to optimize power consumption on a per-slot basis. To that end, the exemplary frequency/voltage selection component may include a minimum frequency adjustment hardware that pre-calculates a minimum frequency-lookup table based on static or semi-static cell configuration parameters and available frequency/voltage levels at the DP subsystem. Using the minimum frequency-lookup table, the frequency required by each grant can be quickly identified. A frequency/voltage controller of the frequency/voltage may implement an exemplary threshold-based algorithm to control when to adjust the clock frequency and voltage based on the frequency information identified in the look-up table. The algorithm may use a "frequency-up" threshold that may be different from the "frequency-down" threshold to determine an amount (if any) to adjust the clock frequency and voltage of the system. In some embodiments, "frequency-up" may be more urgent than "frequency-down." This is because "frequency-up" may imply more stringent latency requirements or a low data-throughput scenario, among others. Additional details of the exemplary frequency/voltage selection component and its exemplary power-saving operations are provided below in connection with FIGS. 2-9.

Although the following processing techniques are described in connection with Layer 2 data processing, the same or similar techniques may be applied to Layer 3 and/or Layer 4 data processing to optimize power consumption at the PHY, Layer 3, and/or Layer 4 subsystems without departing from the scope of the present disclosure.

Figure 2:
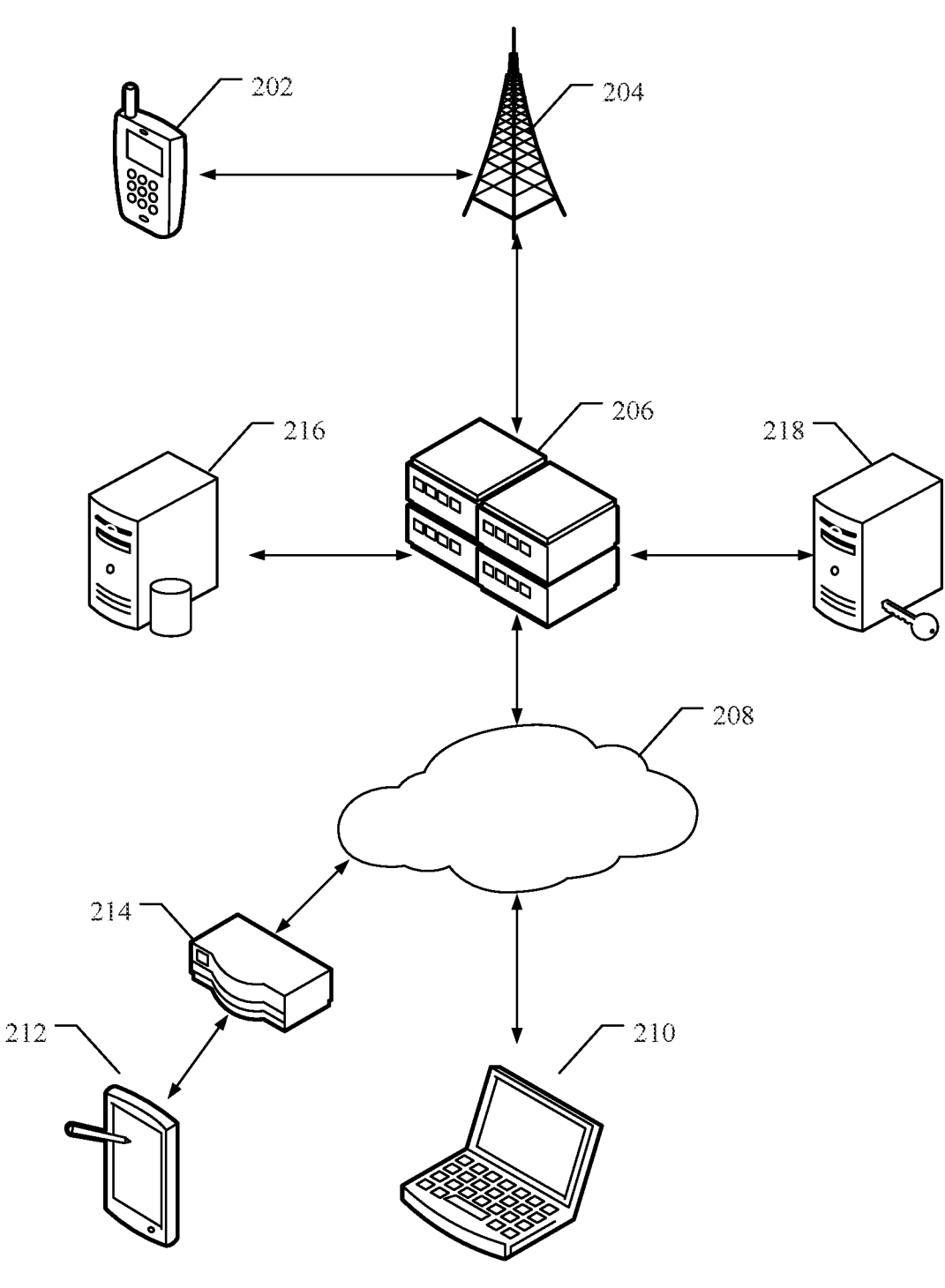
FIG. 2 illustrates an exemplary wireless network, according to some embodiments of the present disclosure.

FIG. 2 illustrates an exemplary wireless network 200, in which some aspects of the present disclosure may be implemented, according to some embodiments of the present disclosure. As shown in FIG. 2, wireless network 200 may include a network of nodes, such as user equipment 202, an access node 204, and a core network element 206. User equipment 202 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 202 is illustrated as a mobile phone simply by way of illustration and not by way of limitation.

Access node 204 may be a device that communicates with user equipment 202, such as a wireless access point, a base station (BS), a Node B, an enhanced Node B (eNodeB or eNB), a next-generation NodeB (gNodeB or gNB), a cluster master node, or the like. Access node 204 may have a wired connection to user equipment 202, a wireless connection to user equipment 202, or any combination thereof. Access node 204 may be connected to user equipment 202 by multiple connections, and user equipment 202 may be connected to other access nodes in addition to access node 204. Access node 204 may also be connected to other user equipments. When configured as a gNB, access node 204 may operate in millimeter wave (mmW) frequencies and/or near mmW frequencies in communication with the user equipment 202. When access node 204 operates in mmW or near mmW frequencies, the access node 204 may be referred to as an mmW base station. Extremely high frequency (EHF) is part of the radio frequency (RF) in the electro-magnetic spectrum. EHF has a range of 30 GHz to 300 GHZ and a wavelength between 1 millimeter and 10 millimeters. Radio waves in the band may be referred to as a millimeter wave. Near mmW may extend down to a frequency of 3 GHZ with a wavelength of 200 millimeters. The super high frequency (SHF) band extends between 3 GHZ and 30 GHZ, also referred to as centimeter wave. Communications using the mmW or near mmW radio frequency band have extremely high path loss and a short range. The mmW base station may utilize beamforming with user equipment 202 to compensate for the extremely high path loss and short range. It is understood that access node 204 is illustrated by a radio tower by way of illustration and not by way of limitation.

Access nodes 204, which are collectively referred to as E-UTRAN in the evolved packet core network (EPC) and as NG-RAN in the 5G core network (5GC), interface with the EPC and 5GC, respectively, through dedicated backhaul links (e.g., S1 interface). In addition to other functions, access node 204 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. Access nodes 204 may communicate directly or indirectly (e.g., through the 5GC) with each other over backhaul links (e.g., X2 interface). The backhaul links may be wired or wireless.

Core network element 206 may serve access node 204 and user equipment 202 to provide core network services. Examples of core network element 206 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 206 includes an access and mobility management function (AMF), a session management function (SMF), or a user plane function (UPF) of the 5GC for the NR system. The AMF may be in communication with a Unified Data Management (UDM). The AMF is the control node that processes the signaling between the user equipment 202 and the 5GC. Generally, the AMF provides QoS flow and session management. All user Internet protocol (IP) packets are transferred through the UPF. The UPF provides user equipment (UE) IP address allocation as well as other functions. The UPF is connected to the IP Services. The IP Services may include the Internet, an intranet, an IP Multimedia Subsystem (IMS), a PS Streaming Service, and/or other IP services. It is understood that core network element 206 is shown as a set of rack-mounted servers by way of illustration and not by way of limitation.

Core network element 206 may connect with a large network, such as the Internet 208, or another Internet Protocol (IP) network, to communicate packet data over any distance. In this way, data from user equipment 202 may be communicated to other user equipments connected to other access points, including, for example, a computer 210 connected to Internet 208, for example, using a wired connection or a wireless connection, or to a tablet 212 wirelessly connected to Internet 208 via a router 214. Thus, computer 210 and tablet 212 provide additional examples of possible user equipments, and router 214 provides an example of another possible access node.

A generic example of a rack-mounted server is provided as an illustration of core network element 206. However, there may be multiple elements in the core network including database servers, such as a database 216, and security and authentication servers, such as an authentication server 218. Database 216 may, for example, manage data related to user subscription to network services. A home location register (HLR) is an example of a standardized database of subscriber information for a cellular network. Likewise, authentication server 218 may handle authentication of users, sessions, and so on. In the NR system, an authentication server function (AUSF) device may be the entity to perform user equipment authentication. In some embodiments, a single server rack may handle multiple such functions, such that the connections between core network element 206, authentication server 218, and database 216, may be local connections within a single rack.

Figure 3:
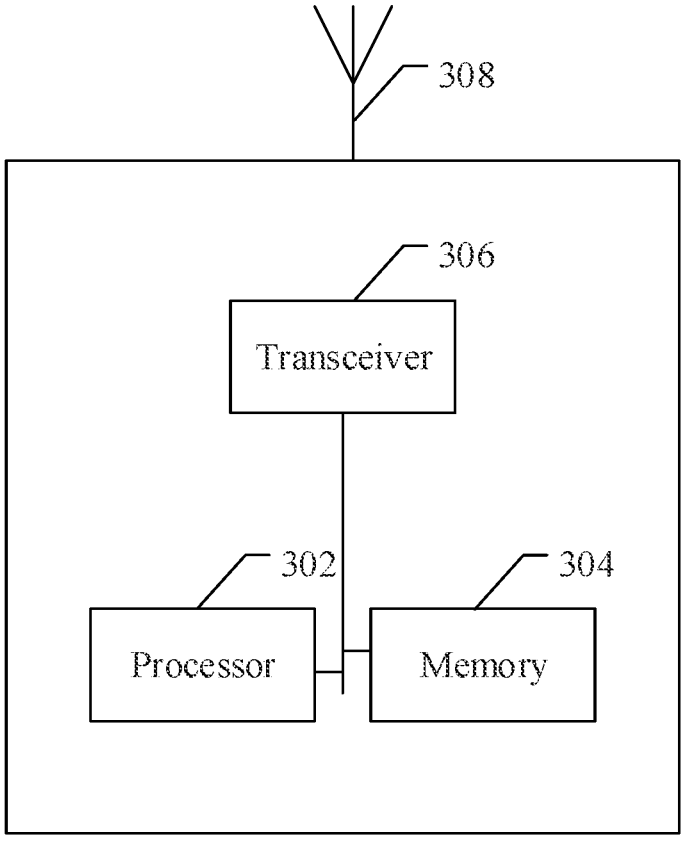
FIG. 3 illustrates a block diagram of an exemplary node, according to some embodiments of the present disclosure.

Each element in FIG. 2 may be considered a node of wireless network 200. More detail regarding the possible implementation of a node is provided by way of example in the description of a node 300 in FIG. 3. Node 300 may be configured as user equipment 202, access node 204, or core network element 206 in FIG. 2. Similarly, node 300 may also be configured as computer 210, router 214, tablet 212, database 216, or authentication server 218 in FIG. 2. As shown in FIG. 3, node 300 may include a processor 302, a memory 304, and a transceiver 306. These components are shown as connected to one another by a bus, but other connection types are also permitted. When node 300 is user equipment 202, additional components may also be included, such as a user interface (UI), sensors, and the like. Similarly, node 300 may be implemented as a blade in a server system when node 300 is configured as core network element 206. Other implementations are also possible.

Transceiver 306 may include any suitable device for sending and/or receiving data. Node 300 may include one or more transceivers, although only one transceiver 306 is shown for simplicity of illustration. An antenna 308 is shown as a possible communication mechanism for node 300. Multiple antennas and/or arrays of antennas may be utilized for receiving multiple spatially multiplex data streams. Additionally, examples of node 300 may communicate using wired techniques rather than (or in addition to) wireless techniques. For example, access node 204 may communicate wirelessly to user equipment 202 and may communicate by a wired connection (for example, by optical or coaxial cable) to core network element 206. Other communication hardware, such as a network interface card (NIC), may be included as well.

As shown in FIG. 3, node 300 may include processor 302. Although only one processor is shown, it is understood that multiple processors can be included. Processor 302 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 302 may be a hardware device having one or more processing cores. Processor 302 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 3, node 300 may also include memory 304. Although only one memory is shown, it is understood that multiple memories can be included. Memory 304 can broadly include both memory and storage. For example, memory 304 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 302. Broadly, memory 304 may be embodied by any computer-readable medium, such as a non-transitory computer-readable medium.

Processor 302, memory 304, and transceiver 306 may be implemented in various forms in node 300 for performing wireless communication functions. In some embodiments, at least two of processor 302, memory 304, and transceiver 306 are integrated into a single system-on-chip (SoC) or a single system-in-package (SiP). In some embodiments, processor 302, memory 304, and transceiver 306 of node 300 are implemented (e.g., integrated) on one or more SoCs. In one example, processor 302 and memory 304 may be integrated on an application processor (AP) SoC (sometimes known as a "host," referred to herein as a "host chip") that handles application processing in an operating system (OS) environment, including generating raw data to be transmitted. In another example, processor 302 and memory 304 may be integrated on a baseband processor (BP) SoC (sometimes known as a "modem," referred to herein as a "baseband chip") that converts the raw data, e.g., from the host chip, to signals that can be used to modulate the carrier frequency for transmission, and vice versa, which can run a real-time operating system (RTOS). In still another example, processor 302 and transceiver 306 (and memory 304 in some cases) may be integrated on an RF SoC (sometimes known as a "transceiver," referred to herein as an "RF chip") that transmits and receives RF signals with antenna 308. It is understood that in some examples, some or all of the host chip, baseband chip, and RF chip may be integrated as a single SoC. For example, a baseband chip and an RF chip may be integrated into a single SoC that manages all the radio functions for cellular communication.

Referring back to FIG. 2, in some embodiments, user equipment 202 may be configured to implement an exemplary clock frequency adjustment technique. The exemplary clock frequency adjustment technique may dynamically adjust clock frequency and voltage for slot-data rate and packet-size variation, as well as for different latency-tolerance requirements to achieve power optimization. Additional details of the exemplary clock frequency adjustment technique are provided below in connection with FIGS. 4-9.

Figure 4:
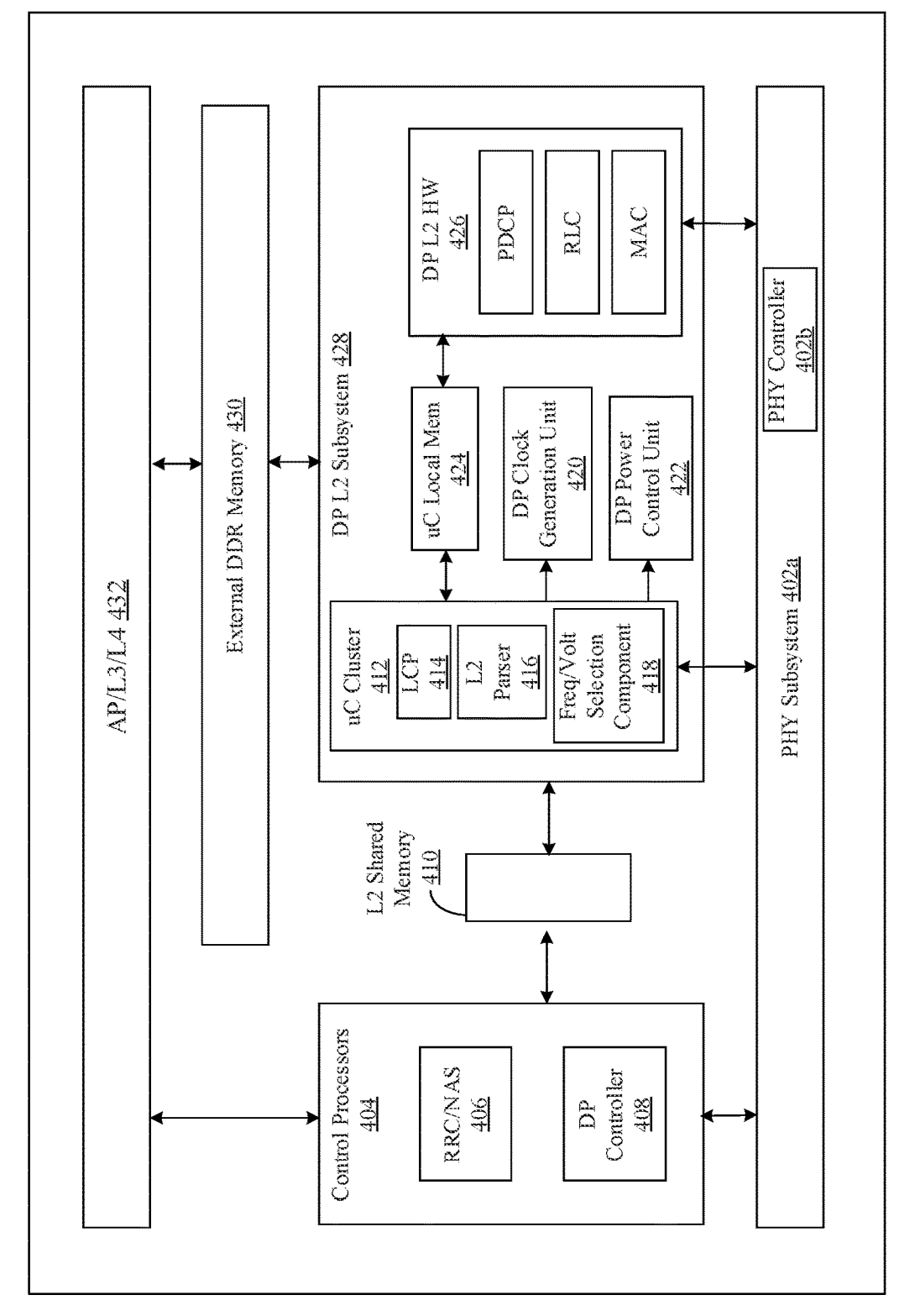
FIG. 4 illustrates a block diagram of an exemplary baseband chip, according to some embodiments of the present disclosure.
Figure 5:
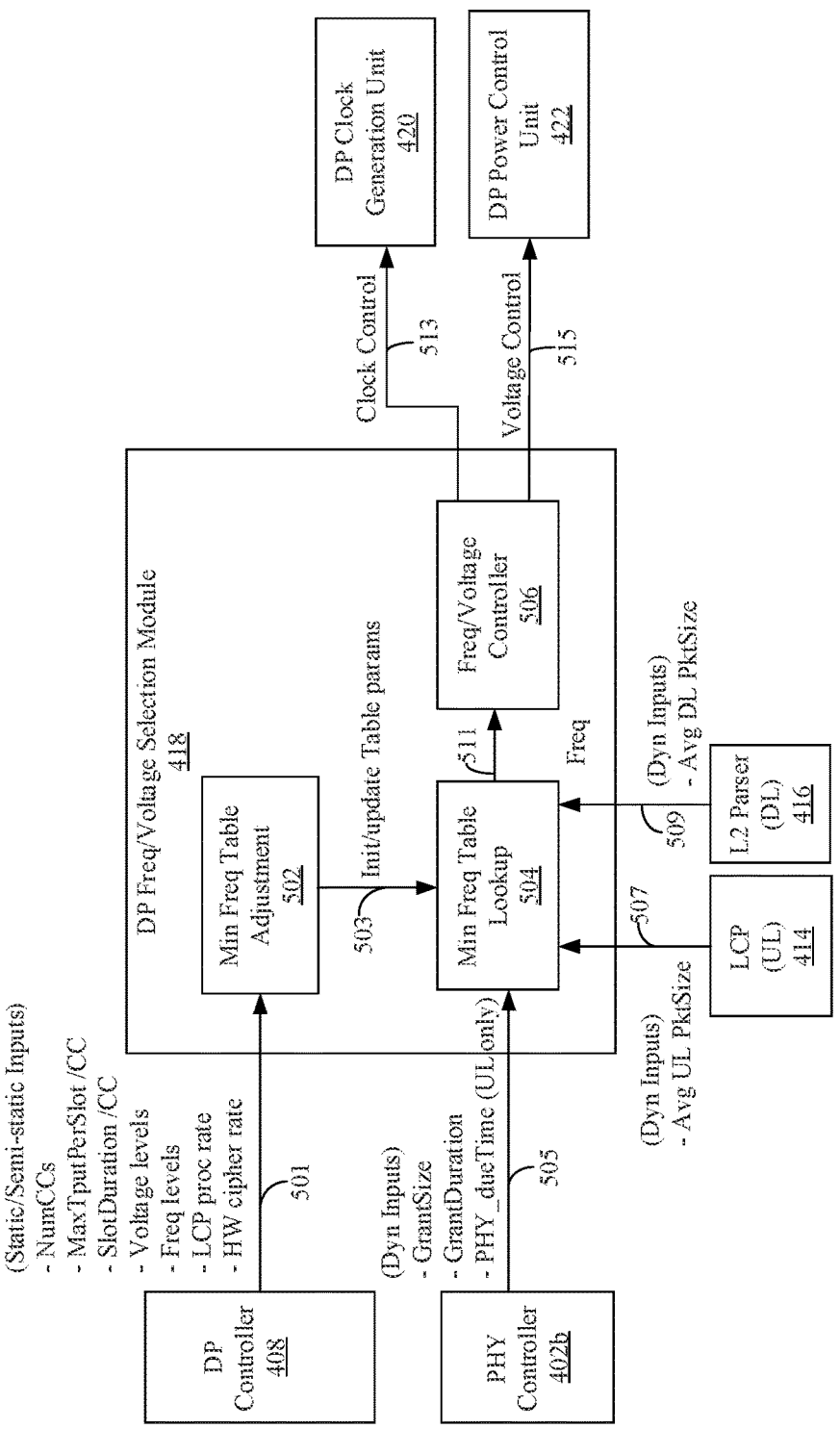
FIG. 5 illustrates a block diagram of an exemplary DP frequency/voltage selection component of the baseband chip of FIG. 4, according to some aspects of the present disclosure.
Figure 6:
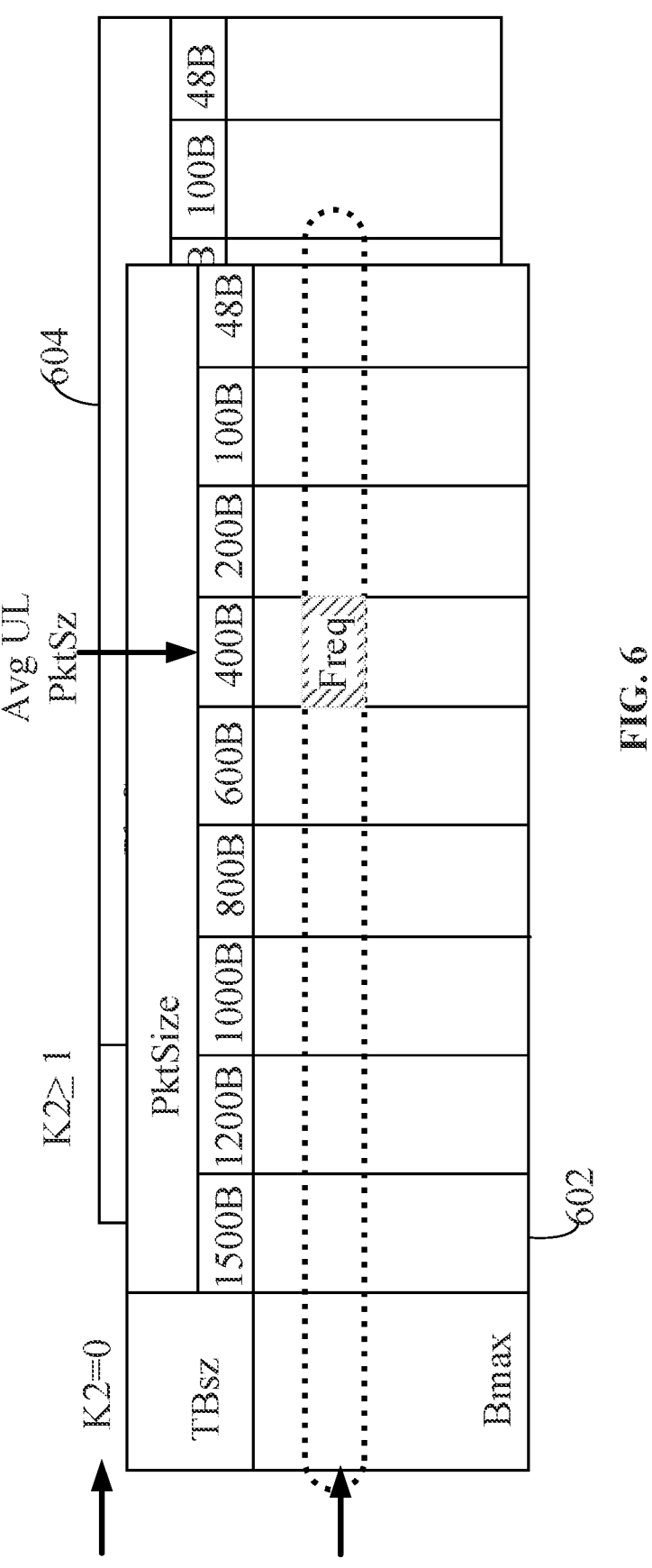
FIG. 6 illustrates an exemplary uplink (UL) frequency look-up table that may be used by the exemplary DP frequency/voltage selection component of FIG. 5, according to some embodiments of the present disclosure.
Figure 7:
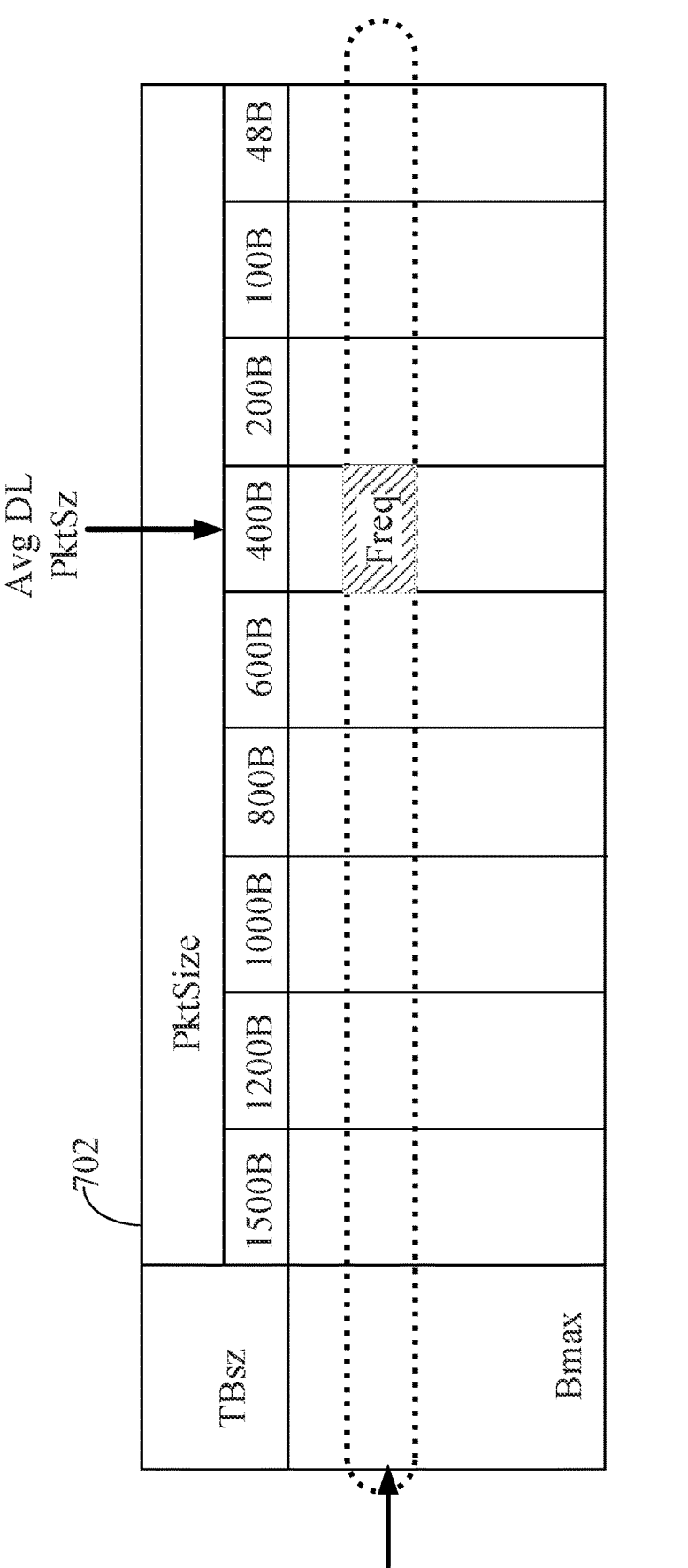
FIG. 7 illustrates an exemplary downlink (DL) frequency look-up table that may be used by the exemplary DP frequency/voltage selection component of FIG. 5, according to some embodiments of the present disclosure.

FIG. 4 illustrates a detailed block diagram of an exemplary baseband chip 400 (referred to hereinafter as "baseband chip 400"), according to some embodiments of the present disclosure. FIG. 5 illustrates a block diagram 500 of an exemplary DP frequency/voltage selection component 418 of the baseband chip of FIG. 4, according to some aspects of the present disclosure. FIG. 6 illustrates an exemplary UL minimum frequency-lookup table 600 that may be used by the exemplary DP frequency/voltage selection component 418 of FIGS. 4 and 5, according to some embodiments of the present disclosure. FIG. 7 illustrates an exemplary DL frequency look-up table 700 that may be used by the exemplary DP frequency/voltage selection 418 component of FIGS. 4 and 5, according to some embodiments of the present disclosure. FIGS. 4-7 will be described together.

Referring to FIG. 4, baseband chip 400 may include, e.g., a PHY subsystem 402a with a PHY controller 402b, a set of control processors 404, a Layer 2 shared memory 410, a DP Layer 2 subsystem 428, an external double-data-rate (DDR) memory 430, and an application processor (AP)/Layer 3 subsystem/Layer 4 subsystem 432. The control processors 404 may include, e.g., a radio resource control (RRC)/non-access stratum (NAS) controller 406 and a DP controller 408 configured to control operations performed by DP Layer 2 subsystem 428. DP Layer 2 subsystem 428 (referred to hereinafter "DP subsystem 428") may include, e.g., a uC cluster 412, a DP clock generation unit 420 (e.g., hardware, firmware, software, or any combination thereof), a DP power control unit 422 (e.g., hardware, firmware, software, or any combination thereof), a uC local memory 424, and DP Layer 2 hardware 426 configured to perform Layer 2 data processing, just to name a few. uC cluster 412 may include an LCP unit 414 (UL), a Layer 2 parsing unit 416 (DL), and an exemplary frequency/voltage selection component 418 (e.g., hardware, firmware, software, or any combination thereof) (referred to herein after as "frequency/voltage selection component 418").

To increase baseband chip-power efficiency, DP Layer 2 subsystem 428 may be designed as a separate clock frequency domain and power domain, which allows for power-consumption optimization at DP subsystem 428 based on its processing capabilities and the real-time workload.

Power-consumption optimization may be achieved by dynamically adjusting the clock frequency and the voltage level at which DP subsystem 428 operates while satisfying the timing constraints on the Layer 2 packet processing. For UL DP Layer 2 processing, the data preparation time is mainly subject to the scheduled over-the-air transmission time and the processing time of the PHY subsystem 402a. For DL DP Layer 2 processing, the data processing time is mainly subject to the pipeline processing constraints and the traffic quality-of-service (QoS) requirements.

Frequency/voltage selection component 418 dynamically selects the optimal clock frequency and voltage levels for DP subsystem 428. For example, frequency/voltage selection component 418 may determine a frequency-level adjustment and a voltage-level adjustment associated with a slot based on a set of inputs. The set of inputs may include one or more of static, semi-static, and dynamic inputs, for example. Frequency/voltage selection component 418 may configure the DP clock generation unit with the frequency-level adjustment and may configure the DP power control unit with the voltage-level adjustment.

Referring to FIG. 5, frequency/voltage selection component 418 may include a minimum frequency-table adjustment unit 502 (e.g., hardware, firmware, software, or any combination thereof), a minimum frequency-table look-up unit 504 (e.g., hardware, firmware, software, or any combination thereof), and a frequency/voltage controller 506 (e.g., hardware, firmware, software, or any combination thereof). Minimum frequency-table adjustment unit 502 may calculate the minimum frequency to meet the timing requirements associated with a slot. Minimum frequency-table adjustment unit 502 may generate/update/adjust the minimum frequency-lookup table based on a set of static or semi-static inputs received (at 501) from DP controller 408. These static and semi-static inputs may roughly fall into one of three categories: 1) cell configurations, e.g., such as the number of CCs, maximum UL/DL throughput, and slot/symbol duration, 2) available resources, e.g., such as clock frequency levels and the corresponding voltage levels currently supported by DP subsystem 428, and 3) DP processing capabilities, e.g., such as the initial grant processing time, the LCP processing time per protocol data unit (PDU), as well as the ciphering rate per packet. Due to the different processing procedures and timing requirements, minimum frequency-table adjustment unit 502 may generate separate minimum frequency-lookup tables for the UL an DL directions, as illustrated in FIGS. 6 and 7, respectively.

Referring to FIGS. 5 and 6 and the generation of the minimum frequency-lookup table for the UL direction, the UL DP Layer 2 data processing on a per-packet basis generally includes four steps: 1) uC cluster 412 processes a grant indication from PHY controller 402b, 2) uC cluster 412 runs the LCP procedure (e.g., using LCP unit 414) to generate commands for DP Layer 2 hardware 426, 3) DP Layer 2 hardware 426 retrieves Layer 3 data from external DDR memory 430, and DP Layer 2 hardware 426 runs packet data protocol (PDCP)/radio link control (RLC)/media access control (MAC) functions to generate a MAC PDU, which may be sent to PHY subsystem 402a for transmission to a base station. Hence, the total Layer 2 packet processing time depends on various factors including, but not limited to, the number of packets to process, the uC processing rate per packet, packet size, the processing rate (e.g., ciphering rate per packet) of DP Layer 2 hardware 426, the clock frequency, and DDR latency, just to name a few. With pipelined processing, the dominant processing time may be uC processing time, DDR latency, or HW processing time, for example. The total UL L2 processing time may be calculated according to expression (1) shown below.

$$T\_L2Proc\_UL = T0(ClkFreq) + W1*T1(ClkFreq) + W2*T2 + W3*T3(PktSize, ClkFreq) \quad (1),$$

where ClkFreq is the operating clock frequency of DP subsystem 428, W1, W2, and W3 are weights that depend on which step in the pipeline processing takes the most amount of time (e.g., if LCP processing time is dominant, W1=NumPkts, W2=1, and W3=1; if DDR latency is dominant, W1=1, W2=NumPkts, and W3=1; if HW processing time is dominant, W1=1, W2=1, and W3=NumPkts), T0 is the initial grant processing time, varying with DP ClkFreq, T1 is the uC processing time per packet, varying with DP ClkFreq, T2 is the DDR latency per packet, which has no dependence on the DP ClkFreq, and T3 is the HW processing time per packet, varying with of DP ClkFreq.

To avoid underflow and network performance degradation, DP subsystem 428 may be configured to process packets fast enough to ensure PHY subsystem 402a has enough data when it starts encoding and modulation. Thus, the DP Layer 2 processing time may be required to meet a threshold $(T_{UL\_Thld})$, which has a dependence on the PHY processing time and K2, as illustrated below in expression 2.

$$T\_L2Proc\_UL \le T_{UL\_Thld}, \tag{2}$$

where T_L2Proc_UL is the UL DP Layer 2 processing time for a UL packet to be ready for PHY subsystem 402a and $T_{UL\_Thld}$ is the threshold.

The T_L2Proc_UL increases as the clock frequency decreases. Thus, minimum frequency-table adjustment unit 502 finds the minimum frequency that makes the above inequality seen in expression (2) hold. If PHY subsystem 402a retrieves the data from DP subsystem 428 (e.g., from an inline buffer of DP Layer 2 hardware 426) on a per-CB basis or on a per-orthogonal frequency division multiplexed (OFDM) symbol basis, then timing constraints may apply to each CB or each OFDM symbol. Examples of these timing constraints are illustrated below in expressions (3)-(5).

$$\text{First } CB/\text{Symbol Proc Time: } T\_L2Proc\_UL\_1 < T_{UL\_Thld\_1}; \tag{3}$$

$$\text{First } 2 CBs/\text{Symbols Proc Time: } T\_L2Proc\_UL\_2 < T_{UL\_Thld\_2}; \text{ and} \tag{4}$$

$$\dots$$

$$\text{All } 2 CBs/\text{Symbols Proc Time: } T\_L2Proc\_UL\_N < T_{UL\_Thld\_N}. \tag{5}$$

After calculating the clock frequency, minimum frequency-table adjustment unit 502 may generate the UL minimum frequency-lookup table 600 shown in FIG. 6. K2 may refer to the offset between the slot where the physical downlink control channel (PDCCH)/downlink control information (DCI), which schedules a UL transmission, is received and the slot where the UL packet is scheduled for transmission via the physical uplink shared channel (PUSCH). Typically, K2=0 for ultra-reliable low latency communication (URLLC) data and K2≥1 for enhanced mobile broadband (eMBB) data. In other words, different K2 values may indicate different requirements on preparation time, and thus, different PHY subsystem due times (e.g., $T_{DUE\_TIME}$). To that end, minimum frequency-table adjustment unit 502 may create a first minimum frequency-lookup table 602 for K2=0 and a second minimum frequency-lookup table 604 for K2≥1, each corresponding to different $T_{DUE\_TIME}$ requirements. $B_{max}$ is the maximum data rate per slot, which can be derived from the cell group configuration. Minimum frequency-table adjustment unit 502 may send (at 503) the first and second minimum frequency-lookup tables 602, 604 to minimum frequency-table look-up unit 504. For each grant indication from the PHY controller 402b, minimum frequency-table look-up unit 504 may calculate the slot rate G can be calculated using the grantSize/grantDuration (e.g., a second set of dynamic inputs) sent (at 505) from PHY controller 402b. In UL minimum frequency-lookup table 600 illustrated in FIG. 6, for a given pair of {G, AvgULPktSize}, there is a corresponding frequency value. The average UL packet size (AvgDLPktSize) may be received (at 507) from LCP unit 414. K2 and G may be identified from the UL grant. Bmax in the UL minimum frequency look up table 600 of FIG. 6 may be the maximum data rate.

Referring to FIGS. 5 and 7, the DL DP Layer 2 data processing on a per-packet basis generally includes three steps: 1) Layer 2 parsing unit 416 parses the MAC/RLC/PDCP headers of the received MAC PDU, 2) DP Layer 2 hardware 426 performs deciphering and integrity check, and 3) either DP Layer 2 hardware 426 or uC cluster 412 preform RLC/PDCP window updating and re-ordering, if needed. Thus, the total DP Layer 2 processing time has dependences on various factors, e.g., the number of packets to be processed, the uC processing rate per packet, packet size, the processing rate (e.g., deciphering rate per packet) of DP Layer 2 hardware 426, and the clock frequency, for example. With pipeline processing, the dominant processing time may be the uC processing time, DDR latency, or HW processing time. The total DL DP Layer 2 processing time may be calculated by minimum frequency-table adjustment unit 502 according to expression (6), seen below.

$$T\_L2Proc\_DL = \tag{6}$$
$$W1 * T1(ClkFreq) + W2 * T2(PktSize, ClkFreq) + W3 * T3(ClkFreq),$$

where ClkFreq is the operating clock frequency of DP subsystem 428, W1-W3 are the weights that depend on which step takes the most amount of time in the pipeline processing (e.g., if the header parsing time is dominant, W1=NumPkts, W2=1, and W3=1; if the deciphering time is dominant, W1=1, W2=NumPkts, and W3=1; and if the RLC/PDCP window updating time is dominant, W1=1, W2=1, and W3=NumPkts), T1 is the header parsing time per packet, varying with DP ClkFreq, T2 is the deciphering time per packet, varying with DP ClkFreq and PktSize, T3 is the RLC/PDCP window updating time per packet, varying with the ClkFreq.

To avoid overflow and QoS violation, DP subsystem 428 may process the received DL packets fast enough to ensure DL packets received in a slot can be processed within the time of one slot. Thus, the DP layer 2 processing time should meet a threshold ($T_{DL\_Thld}$), as illustrated below in expression (7).

$$T\_L2Proc\_DL \le T_{DL\_Thld}, \tag{7}$$

where T_L2Proc_DL is the DL DP Layer 2 processing time for a DL packet, and $T_{DL\_Thld}$ is the threshold.

The T_L2Proc_DL increases as the clock frequency decreases. Thus, minimum frequency-table adjustment unit 502 may identify the minimum frequency that makes the above inequality of expression (7) hold.

After calculating this clock frequency, minimum frequency-table adjustment unit 502 may generate the DL table seen in FIG. 7. Here again, $B_{max}$ is the maximum data rate per slot, which can be derived from the cell group configuration. Minimum frequency-table adjustment unit 502 may send (at 503) the DL minimum frequency look-up table to minimum frequency-table look-up unit 504. For each DL grant indication from PHY controller 402b, the slot rate G can be calculated using the grantSize/grantDuration. In the table, for a given pair of {G, AvgDLPktSize}, there is a corresponding frequency value, which may be determined/identified by DL minimum frequency look-up table. The average downlink packet size (AvgDLPktSize) may be received (at 509) from Layer 2 parsing unit 416.

Referring again to FIG. 5, the minimum frequency-table look-up unit 504 may identify the corresponding DP clock frequency for each grant indication received (at 505) from PHY controller 402b. The grant indication provides information such as grant size, grant duration, and PHY expected due time, which will be used to derive the index of the minimum frequency look-up table. Information associated with the corresponding DP clock frequency for each grant indication may be sent (at 511) to frequency/voltage controller 506.

Frequency/voltage controller 506, which is responsible for determining whether to adjust the clock frequency and/or the voltage, as well as the new frequency/voltage values. Once a new clock frequency and/or voltage level is determined, frequency/voltage controller 506 may send (at 513) a frequency control signal to DP clock generation unit 420 to adjust the clock frequency, and/or send (at 515) a voltage control signal to the DP power control unit 422 to implement a power voltage adjustment.

Figure 8:
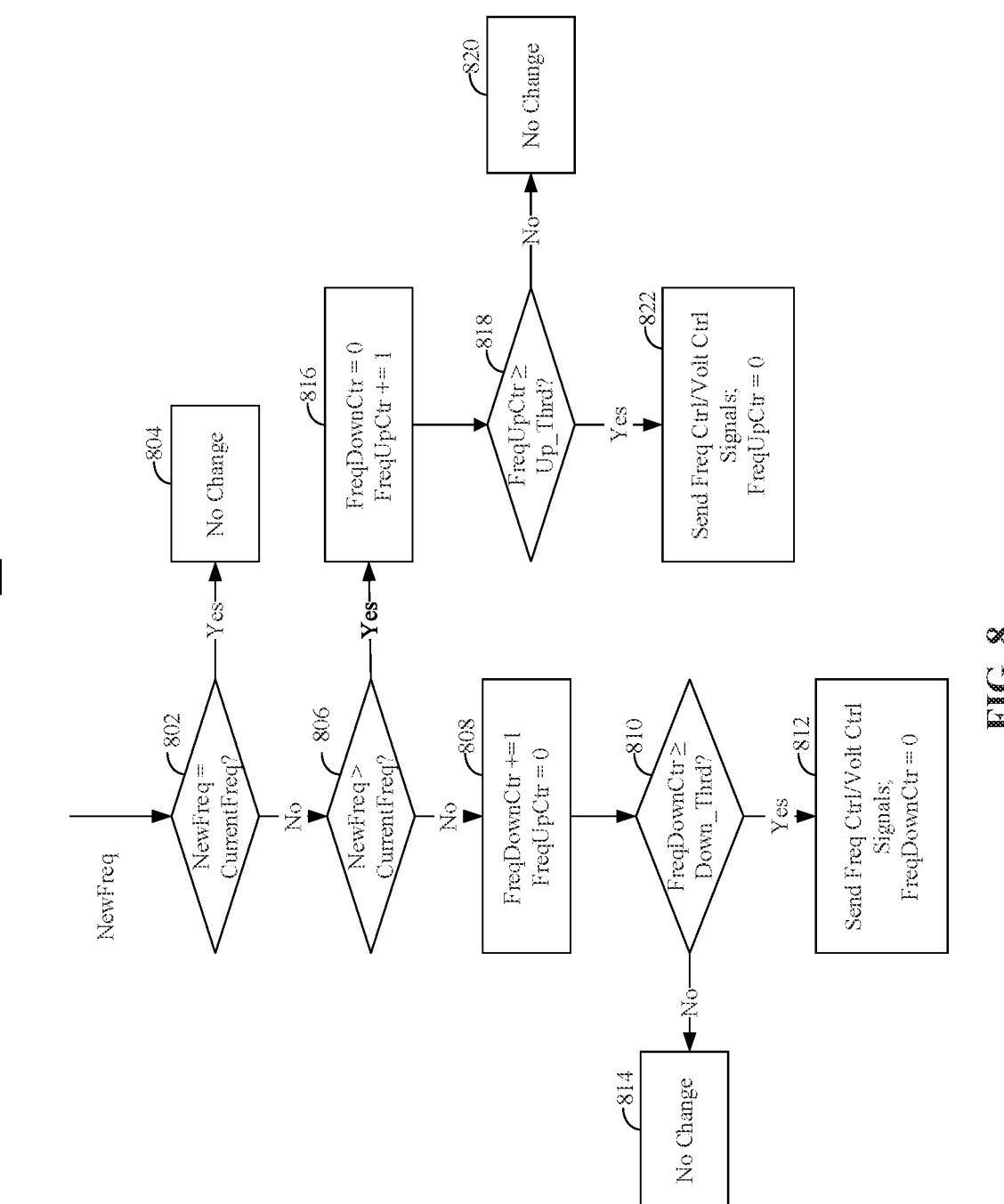
FIG. 8 is a flowchart of a first exemplary method of wireless communication, according to some embodiments of the present disclosure.

FIG. 8 is a flowchart of a first exemplary method 800 of wireless communication, according to some embodiments of the present disclosure. Method 800 may be performed by, e.g., user equipment 202, baseband chip 400, DP subsystem 428, uC cluster 412, frequency/voltage selection component 418, and/or frequency/voltage controller 506, just to name a few. Method 800 may include steps 802-822 as described below. It is to be appreciated that some of the steps may be optional, and some of the steps may be performed simultaneously, or in a different order than shown in FIG. 8.

At 802, the apparatus may determine whether the new frequency is the same as the current frequency. In response to determining that the new frequency is the same as the current frequency (YES: 802), the operations may move to 804. At 804, no change is frequency is implemented. On the other hand, in response to determining that the new frequency is not the same as the current frequency (NO: 802), the operations may move to 806. At 806, the apparatus may determine whether the new frequency is greater than the current frequency. In response to determining that the new frequency is not greater than the current frequency (NO: 806), the operations may move to 808. In response to determining that the new frequency is greater than the current frequency (YES: 806), the operations may move to 816. At 808, the apparatus may increase a frequency-down counter value by one and maintain the frequency-up counter value at zero. At 810, the apparatus may determine whether the frequency-down counter value is greater than or equal to a frequency-down threshold (Down_Thrd) value. In response to determining that the frequency-down counter value is not greater than or equal to the frequency Down_Thrd, the operations may move to 814, where no change is made. On the other hand, in response to determining that the frequency down counter is greater than or equal to the Down_Thrd, the operations may move to 812. At 812, the apparatus may send a frequency control signal to a DP clock frequency generation unit to decrease the clock frequency of the DP subsystem, send a voltage control signal to a DP voltage control unit to decrease the voltage of the DP subsystem, and reset the frequency-down counter value to zero. At 816, the apparatus may maintain the frequency-down counter value at zero and increase the frequency-up counter value by one. At 818, the apparatus may determine whether the frequency-up counter value is greater than or equal to a frequency-up threshold (Up_Thrd). In response to the frequency-up counter not being greater than or equal to the Up_Thrd, the operations may move to 820, where no change in frequency or voltage is made. On the other hand, in response to determining that the frequency-up counter value is greater than or equal to the Up_Thrd, the operations may move to 822. At 822, the apparatus may send a frequency control signal to a DP clock frequency generation unit to increase the clock frequency of the DP subsystem, send a voltage control signal to a DP power control unit to increase the voltage of the DP subsystem, and reset the frequency-up counter value to zero.

FIG. 9 is a flowchart of a first exemplary method 900 of wireless communication, according to some embodiments of the present disclosure. Method 900 may be performed by, e.g., user equipment 202, baseband chip 400, DP subsystem 428, uC cluster 412, frequency/voltage selection component 418, minimum frequency-table adjustment unit 502, minimum frequency-table look-up unit 504, frequency/voltage controller 506, DP clock generation unit 420, and/or DP power control unit 422, just to name a few. Method 900 may include steps 902-914 as described below. It is to be appreciated that some of the steps may be optional, and some of the steps may be performed simultaneously, or in a different order than shown in FIG. 9.

At 902, the apparatus may set, by a DP clock generation unit of a DP subsystem, a frequency level for the DP subsystem. For example, referring to FIGS. 4 and 5, DP clock generation unit 420 may set a clock frequency for DP subsystem 428.

At 904, the apparatus may set, by a DP power control unit of the DP subsystem, a voltage level for the DP subsystem. For example, referring to FIGS. 4 and 5, DP power control unit 422 may set a voltage for DP subsystem 428.

At 906, the apparatus may determine, by a DP frequency/voltage selection component of a uC cluster, a frequency-level adjustment and a voltage-level adjustment associated with a slot based on a set of inputs. For example, referring to FIGS. 4 and 5, DP frequency/voltage selection component 418 may determine a frequency-level adjustment and a voltage-level adjustment using the operations described above in connections with FIGS. 4-7. These operations may be performed by, e.g., minimum frequency-table adjustment unit 502, minimum frequency-table look-up unit 504, and frequency/voltage controller 506, for example.

At 908, the apparatus may configure, by the DP frequency/voltage selection component of the uC cluster, the DP clock generation unit with the frequency-level adjustment. For example, referring to FIG. 5, frequency/voltage controller 506 may send (at 513) a frequency control signal to configure DP clock generation unit 420 with the adjusted clock frequency.

At 910, the apparatus may configure, by the DP frequency/voltage selection component of the uC cluster, the DP power control unit with the voltage-level adjustment. For example, referring to FIG. 5, frequency/voltage controller 506 may send (at 515) a voltage control signal to configure DP power control unit 422 with a power-voltage adjustment.

At 912, the apparatus may set, by the DP clock generation unit, a new frequency level for the DP subsystem based on the frequency-level adjustment configured by the frequency/voltage controller. For example, referring to FIGS. 4 and 5, DP clock generation unit 420 may set the adjusted clock frequency for DP subsystem 428.

At 914, the apparatus may set, by the DP power control unit, a new voltage level for the DP subsystem based on the voltage-level adjustment configured by the frequency/voltage controller. For example, referring to FIGS. 4 and 5, DP power control unit 422 may set the voltage adjustment for DP subsystem 428.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 300 in FIG. 3. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, a baseband chip is provided. The baseband chip may include a DP subsystem. The DP subsystem may include a DP clock generation unit configured to set a frequency level for the DP subsystem. The DP subsystem may include a DP power control unit configured to set a voltage level for the DP subsystem. The DP subsystem may include a uC cluster. The uC cluster may include a DP frequency/voltage selection component. The DP frequency/voltage selection component may be configured to determine a frequency-level adjustment and a voltage-level adjustment associated with a slot based on a set of inputs. The DP frequency/voltage selection component may be configured to configure the DP clock generation unit with the frequency-level adjustment. The DP frequency/voltage selection component may be configured to configure the DP power control unit with the voltage-level adjustment.

In some embodiments, to determine the frequency-level adjustment and the voltage-level adjustment associated with the slot based on the set of inputs, the DP frequency/voltage selection component may be configured to receive, by a minimum frequency-table adjustment unit, a set of static and semi-static inputs from a DP controller external to the DP subsystem. In some embodiments, to determine the frequency-level adjustment and the voltage-level adjustment associated with the slot based on the set of inputs, the DP frequency/voltage selection component may be configured to generate, by the minimum frequency-table adjustment unit, a minimum frequency adjustment table based on the set of static and semi-static inputs. In some embodiments, to determine the frequency-level adjustment and the voltage-level adjustment associated with the slot based on the set of inputs, the DP frequency/voltage selection component may be configured to input, by the minimum frequency-table adjustment unit, the minimum frequency adjustment table into a minimum frequency-table look-up unit.

In some embodiments, the set of static and semi-static inputs may include one or more of a number of CCs associated with a grant, a maximum data throughput per slot and CC, a slot duration per CC, an available DP subsystem frequency level, an available DP subsystem voltage level, an LCP processing rate, or a DP hardware cipher rate.

In some embodiments, to determine the frequency-level adjustment and the voltage-level adjustment associated with the slot based on the set of inputs, the DP frequency/voltage selection component may be configured to receive, by the minimum frequency-table look-up unit, the minimum frequency adjustment table from the minimum frequency-table adjustment unit. In some embodiments, to determine the frequency-level adjustment and the voltage-level adjustment associated with the slot based on the set of inputs, the DP frequency/voltage selection component may be configured to receive, by the minimum frequency-table look-up unit, a first dynamic input from a PHY controller external to the DP subsystem, a second dynamic input from an LCP unit, and a third dynamic input from a Layer 2 parsing unit, the DP frequency/voltage selection component including the LCP unit and the Layer 2 parsing unit. In some embodiments, to determine the frequency-level adjustment and the voltage-level adjustment associated with the slot based on the set of inputs, the DP frequency/voltage selection component may be configured to identify, by the minimum frequency-table look-up unit, the frequency-level adjustment based on the minimum frequency adjustment table and one or more of the first dynamic input, the second dynamic input, or the third dynamic input. In some embodiments, to determine the frequency-level adjustment and the voltage-level adjustment associated with the slot based on the set of inputs, the DP frequency/voltage selection component may be configured to input, by the minimum frequency-table look-up unit, the frequency-level adjustment into a frequency/voltage controller.

In some embodiments, the first dynamic input may include a grant size associated with the slot, a grant duration associated with the slot, or a PHY subsystem due time for an uplink packet associated with the slot. In some embodiments, the second dynamic input may include an average-UL packet size associated with the slot. In some embodiments, the third dynamic input may include an average-DL packet size associated with the slot.

In some embodiments, to determine the frequency-level adjustment and the voltage-level adjustment associated with the slot based on the set of inputs, the DP frequency/voltage selection component may be configured to receive, by the frequency/voltage controller, the frequency-level adjustment from the minimum frequency-table look-up unit. In some embodiments, to determine the frequency-level adjustment and the voltage-level adjustment associated with the slot based on the set of inputs, the DP frequency/voltage selection component may be configured to, in response to determining that the frequency-level adjustment meets a frequency-up threshold value or a frequency-down threshold value, identifying a voltage-level adjustment based on the frequency-level adjustment. In some embodiments, to determine the frequency-level adjustment and the voltage-level adjustment associated with the slot based on the set of inputs, the DP frequency/voltage selection component may be configured to, in response to determining that the frequency-level adjustment meets a frequency-up threshold value or a frequency-down threshold value, configure, by the frequency/voltage controller, the DP clock generation unit with the frequency-level adjustment and the DP power control unit with the voltage-level adjustment.

In some embodiments, the DP clock generation unit may be further configured to set a new frequency level for the DP subsystem based on the frequency-level adjustment configured by the frequency/voltage controller. In some embodiments, the DP power control unit may be configured to set a new voltage level for the DP subsystem based on the voltage-level adjustment configured by the frequency/voltage controller.

According to another aspect of the present disclosure, an apparatus for wireless communication of a UE is provided. The UE may include a baseband chip. The baseband chip may include a DP subsystem. The DP subsystem may include a DP clock generation unit configured to set a frequency level for the DP subsystem. The DP subsystem may include a DP power control unit configured to set a voltage level for the DP subsystem. The DP subsystem may include a uC cluster. The uC cluster may include a DP frequency/voltage selection component. The DP frequency/voltage selection component may be configured to determine a frequency-level adjustment and a voltage-level adjustment associated with a slot based on a set of inputs. The DP frequency/voltage selection component may be configured to configure the DP clock generation unit with the frequency-level adjustment. The DP frequency/voltage selection component may be configured to configure the DP power control unit with the voltage-level adjustment.

In some embodiments, to determine the frequency-level adjustment and the voltage-level adjustment associated with the slot based on the set of inputs, the DP frequency/voltage selection component may be configured to receive, by a minimum frequency-table adjustment unit, a set of static and semi-static inputs from a DP controller external to the DP subsystem. In some embodiments, to determine the frequency-level adjustment and the voltage-level adjustment associated with the slot based on the set of inputs, the DP frequency/voltage selection component may be configured to generate, by the minimum frequency-table adjustment unit, a minimum frequency adjustment table based on the set of static and semi-static inputs. In some embodiments, to determine the frequency-level adjustment and the voltage-level adjustment associated with the slot based on the set of inputs, the DP frequency/voltage selection component may be configured to input, by the minimum frequency-table adjustment unit, the minimum frequency adjustment table into a minimum frequency-table look-up unit.

In some embodiments, the set of static and semi-static inputs may include one or more of a number of CCs associated with a grant, a maximum data throughput per slot and CC, a slot duration per CC, an available DP subsystem frequency level, an available DP subsystem voltage level, an LCP processing rate, or a DP hardware cipher rate.

In some embodiments, to determine the frequency-level adjustment and the voltage-level adjustment associated with the slot based on the set of inputs, the DP frequency/voltage selection component may be configured to receive, by the minimum frequency-table look-up unit, the minimum frequency adjustment table from the minimum frequency-table adjustment unit. In some embodiments, to determine the frequency-level adjustment and the voltage-level adjustment associated with the slot based on the set of inputs, the DP frequency/voltage selection component may be configured to receive, by the minimum frequency-table look-up unit, a first dynamic input from a PHY controller external to the DP subsystem, a second dynamic input from an LCP unit, and a third dynamic input from a Layer 2 parsing unit, the DP frequency/voltage selection component including the LCP unit and the Layer 2 parsing unit. In some embodiments, to determine the frequency-level adjustment and the voltage-level adjustment associated with the slot based on the set of inputs, the DP frequency/voltage selection component may be configured to identify, by the minimum frequency-table look-up unit, the frequency-level adjustment based on the minimum frequency adjustment table and one or more of the first dynamic input, the second dynamic input, or the third dynamic input. In some embodiments, to determine the frequency-level adjustment and the voltage-level adjustment associated with the slot based on the set of inputs, the DP frequency/voltage selection component may be configured to input, by the minimum frequency-table look-up unit, the frequency-level adjustment into a frequency/voltage controller.

In some embodiments, the first dynamic input may include a grant size associated with the slot, a grant duration associated with the slot, or a PHY subsystem due time for an uplink packet associated with the slot. In some embodiments, the second dynamic input may include an average-UL packet size associated with the slot. In some embodiments, the third dynamic input may include an average-DL packet size associated with the slot.

In some embodiments, to determine the frequency-level adjustment and the voltage-level adjustment associated with the slot based on the set of inputs, the DP frequency/voltage selection component may be configured to receive, by the frequency/voltage controller, the frequency-level adjustment from the minimum frequency-table look-up unit. In some embodiments, to determine the frequency-level adjustment and the voltage-level adjustment associated with the slot based on the set of inputs, the DP frequency/voltage selection component may be configured to, in response to determining that the frequency-level adjustment meets a frequency-up threshold value or a frequency-down threshold value, identifying a voltage-level adjustment based on the frequency-level adjustment. In some embodiments, to determine the frequency-level adjustment and the voltage-level adjustment associated with the slot based on the set of inputs, the DP frequency/voltage selection component may be configured to, in response to determining that the frequency-level adjustment meets a frequency-up threshold value or a frequency-down threshold value, configure, by the frequency/voltage controller, the DP clock generation unit with the frequency-level adjustment and the DP power control unit with the voltage-level adjustment.

In some embodiments, the DP clock generation unit may be further configured to set a new frequency level for the DP subsystem based on the frequency-level adjustment configured by the frequency/voltage controller. In some embodiments, the DP power control unit may be configured to set a new voltage level for the DP subsystem based on the voltage-level adjustment configured by the frequency/voltage controller.

According to yet another aspect of the present disclosure, a method of wireless communication of a baseband chip is provided. The method may include setting, by a DP clock generation unit of a DP subsystem, a frequency level for the DP subsystem. The method may include setting, by a DP power control unit of the DP subsystem, a voltage level for the DP subsystem. The method may include determining, by a DP frequency/voltage selection component of a uC cluster, a frequency-level adjustment and a voltage-level adjustment associated with a slot based on a set of inputs, the uC cluster being part of the DP subsystem. The method may include configuring, by the DP frequency/voltage selection component of the uC cluster, the DP clock generation unit with the frequency-level adjustment. The method may include configuring, by the DP frequency/voltage selection component of the uC cluster, the DP power control unit with the voltage-level adjustment.

In some embodiments, the determining, by the DP frequency/voltage selection component of the uC cluster, the frequency-level adjustment and the voltage-level adjustment associated with the slot based on the set of inputs may include receiving, by a minimum frequency-table adjustment unit, a set of static and semi-static inputs from a DP controller external to the DP subsystem, the DP frequency/voltage selection component including the minimum frequency-table adjustment unit. In some embodiments, the determining, by the DP frequency/voltage selection component of the uC cluster, the frequency-level adjustment and the voltage-level adjustment associated with the slot based on the set of inputs may include generating, by the minimum frequency-table adjustment unit, a minimum frequency adjustment table based on the set of static and semi-static inputs. In some embodiments, the determining, by the DP frequency/voltage selection component of the uC cluster, the frequency-level adjustment and the voltage-level adjustment associated with the slot based on the set of inputs may include inputting, by the minimum frequency-table adjustment unit, the minimum frequency adjustment table into a minimum frequency-table look-up unit.

In some embodiments, the set of static and semi-static inputs may include one or more of a number of CCs associated with a grant, a maximum data throughput per slot and CC, a slot duration per CC, an available DP subsystem frequency level, an available DP subsystem voltage level, an LCP processing rate, or a DP hardware cipher rate.

In some embodiments, the determining, by the DP frequency/voltage selection component of the uC cluster, the frequency-level adjustment and the voltage-level adjustment associated with the slot based on the set of inputs may include receiving, by the minimum frequency-table look-up unit, the minimum frequency adjustment table from the minimum frequency-table adjustment unit, the DP frequency/voltage selection component including the minimum frequency-table look-up unit. In some embodiments, the determining, by the DP frequency/voltage selection component of the uC cluster, the frequency-level adjustment and the voltage-level adjustment associated with the slot based on the set of inputs may include receiving, by the minimum frequency-table look-up unit, a first dynamic input from a PHY controller external to the DP subsystem, a second dynamic input from an LCP unit, and a third dynamic input from a Layer 2 parsing unit, the DP frequency/voltage selection component including the LCP unit and the Layer 2 parsing unit. In some embodiments, the determining, by the DP frequency/voltage selection component of the uC cluster, the frequency-level adjustment and the voltage-level adjustment associated with the slot based on the set of inputs may include identifying, by the minimum frequency-table look-up unit, the frequency-level adjustment based on the minimum frequency adjustment table and one or more of the first dynamic input, the second dynamic input, or the third dynamic input. In some embodiments, the determining, by the DP frequency/voltage selection component of the uC cluster, the frequency-level adjustment and the voltage-level adjustment associated with the slot based on the set of inputs may include inputting, by the minimum frequency-table look-up unit, the frequency-level adjustment into a frequency/voltage controller. In some embodiments, the first dynamic input may include a grant size associated with the slot, a grant duration associated with the slot, or a PHY subsystem due time for an uplink packet associated with the slot. In some embodiments, the second dynamic input may include an average-UL packet size associated with the slot. In some embodiments, the third dynamic input may include an average-DL packet size associated with the slot.

In some embodiments, the determining, by the DP frequency/voltage selection component of the uC cluster, the frequency-level adjustment and the voltage-level adjustment associated with the slot based on the set of inputs may include receiving, by the frequency/voltage controller, the frequency-level adjustment from the minimum frequency-table look-up unit. In some embodiments, the determining, by the DP frequency/voltage selection component of the uC cluster, the frequency-level adjustment and the voltage-level adjustment associated with the slot based on the set of inputs may include, in response to determining that the frequency-level adjustment meets a frequency-up threshold value or a frequency-down threshold value, identifying a voltage-level adjustment based on the frequency-level adjustment. In some embodiments, the determining, by the DP frequency/voltage selection component of the uC cluster, the frequency-level adjustment and the voltage-level adjustment associated with the slot based on the set of inputs may include, in response to determining that the frequency-level adjustment meets a frequency-up threshold value or a frequency-down threshold value, configure, by the frequency/voltage controller, the DP clock generation unit with the frequency-level adjustment and the DP power control unit with the voltage-level adjustment.

In some embodiments, the method may further include setting, by the DP clock generation unit, a new frequency level for the DP subsystem based on the frequency-level adjustment configured by the frequency/voltage controller. In some embodiments, the method may further include setting, by the DP power control unit, a new voltage level for the DP subsystem based on the voltage-level adjustment configured by the frequency/voltage controller.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A baseband chip, comprising:

a data plane (DP) subsystem, comprising:

a DP clock generation unit configured to set a frequency level for the DP subsystem;

a DP power control unit configured to set a voltage level for the DP subsystem;

a microcontroller (uC) cluster comprising a DP frequency/voltage selection component configured to:

determine a frequency-level adjustment and a voltage-level adjustment associated with a slot based on a set of inputs;

configure the DP clock generation unit with the frequency-level adjustment; and configure the DP power control unit with the voltage-level adjustment.

2. The baseband chip of claim 1, wherein, to determine the frequency-level adjustment and the voltage-level adjustment associated with the slot based on the set of inputs, the DP frequency/voltage selection component is configured to:

receive, by a minimum frequency-table adjustment unit, a set of static and semi-static inputs from a DP controller external to the DP subsystem;

generate, by the minimum frequency-table adjustment unit, a minimum frequency adjustment table based on the set of static and semi-static inputs; and input, by the minimum frequency-table adjustment unit, the minimum frequency adjustment table into a minimum frequency-table look-up unit.

3. The baseband chip of claim 2, wherein the set of static and semi-static inputs includes one or more of a number of component carriers (CCs) associated with a grant, a maximum data throughput per slot and component carrier (CC), a slot duration per CC, an available DP subsystem frequency level, an available DP subsystem voltage level, a logical channel prioritization (LCP) processing rate, or a DP hardware cipher rate.

4. The baseband chip of claim 2, wherein, to determine the frequency-level adjustment and the voltage-level adjustment associated with the slot based on the set of inputs, the DP frequency/voltage selection component is configured to:

receive, by the minimum frequency-table look-up unit, the minimum frequency adjustment table from the minimum frequency-table adjustment unit;

receive, by the minimum frequency-table look-up unit, a first dynamic input from a physical layer (PHY) controller external to the DP subsystem, a second dynamic input from a logical channel prioritization (LCP) unit, and a third dynamic input from a Layer 2 parsing unit, the DP frequency/voltage selection component including the LCP unit and the Layer 2 parsing unit;

identify, by the minimum frequency-table look-up unit, the frequency-level adjustment based on the minimum frequency adjustment table and one or more of the first dynamic input, the second dynamic input, or the third dynamic input; and input, by the minimum frequency-table look-up unit, the frequency-level adjustment into a frequency/voltage controller.

5. The baseband chip of claim 4, wherein:

the first dynamic input includes a grant size associated with the slot, a grant duration associated with the slot, or a PHY subsystem due time for an uplink packet associated with the slot, the second dynamic input includes an average-UL packet size associated with the slot, and the third dynamic input includes an average-DL packet size associated with the slot.

6. The baseband chip of claim 4, wherein, to determine the frequency-level adjustment and the voltage-level adjustment associated with the slot based on the set of inputs, the DP frequency/voltage selection component is configured to:

receive, by the frequency/voltage controller, the frequency-level adjustment from the minimum frequency-table look-up unit;

in response to determining that the frequency-level adjustment meets a frequency-up threshold value or a frequency-down threshold value, identifying a voltage-level adjustment based on the frequency-level adjustment; and in response to determining that the frequency-level adjustment meets a frequency-up threshold value or a frequency-down threshold value, configure, by the frequency/voltage controller, the DP clock generation unit with the frequency-level adjustment and the DP power control unit with the voltage-level adjustment.

7. The baseband chip of claim 6, wherein:

the DP clock generation unit is configured to set a new frequency level for the DP subsystem based on the frequency-level adjustment configured by the frequency/voltage controller, and the DP power control unit is configured to set a new voltage level for the DP subsystem based on the voltage-level adjustment configured by the frequency/voltage controller.

8. An apparatus for a user equipment (UE), comprising:

a baseband chip, comprising:

a data plane (DP) subsystem, comprising:

a DP clock generation unit configured to set a frequency level for the DP subsystem;

a DP power control unit configured to set a voltage level for the DP subsystem;

a microcontroller (uC) cluster comprising a DP frequency/voltage selection component configured to:

determine a frequency-level adjustment and a voltage-level adjustment associated with a slot based on a set of inputs;

configure the DP clock generation unit with the frequency-level adjustment; and configure the DP power control unit with the voltage-level adjustment.

9. The apparatus of claim 8, wherein, to determine the frequency-level adjustment and the voltage-level adjustment associated with the slot based on the set of inputs, the DP frequency/voltage selection component is configured to:

receive, by a minimum frequency-table adjustment unit, a set of static and semi-static inputs from a DP controller external to the DP subsystem;

generate, by the minimum frequency-table adjustment unit, a minimum frequency adjustment table based on the set of static and semi-static inputs; and input, by the minimum frequency-table adjustment unit, the minimum frequency adjustment table into a minimum frequency-table look-up unit.

10. The apparatus of claim 9, wherein the set of static and semi-static inputs includes one or more of a number of component carriers (CCs) associated with a grant, a maximum data throughput per slot and component carrier (CC), a slot duration per CC, an available DP subsystem frequency level, an available DP subsystem voltage level, a logical channel prioritization (LCP) processing rate, or a DP hardware cipher rate.

11. The apparatus of claim 9, wherein, to determine the frequency-level adjustment and the voltage-level adjustment associated with the slot based on the set of inputs, the DP frequency/voltage selection component is configured to:

receive, by the minimum frequency-table look-up unit, the minimum frequency adjustment table from the minimum frequency-table adjustment unit;

receive, by the minimum frequency-table look-up unit, a first dynamic input from a physical layer (PHY) controller external to the DP subsystem, a second dynamic input from a logical channel prioritization (LCP) unit, and a third dynamic input from a Layer 2 parsing unit, the DP frequency/voltage selection component including the LCP unit and the Layer 2 parsing unit;

identify, by the minimum frequency-table look-up unit, the frequency-level adjustment based on the minimum frequency adjustment table and one or more of the first dynamic input, the second dynamic input, or the third dynamic input; and input, by the minimum frequency-table look-up unit, the frequency-level adjustment into a frequency/voltage controller.

12. The apparatus of claim 11, wherein:

the first dynamic input includes a grant size associated with the slot, a grant duration associated with the slot, or a PHY subsystem due time for an uplink packet associated with the slot, the second dynamic input includes an average-UL packet size associated with the slot, and the third dynamic input includes an average-DL packet size associated with the slot.

13. The apparatus of claim 11, wherein, to determine the frequency-level adjustment and the voltage-level adjustment associated with the slot based on the set of inputs, the DP frequency/voltage selection component is configured to:

receive, by the frequency/voltage controller, the frequency-level adjustment from the minimum frequency-table look-up unit;

in response to determining that the frequency-level adjustment meets a frequency-up threshold value or a frequency-down threshold value, identifying a voltage-level adjustment based on the frequency-level adjustment; and in response to determining that the frequency-level adjustment meets a frequency-up threshold value or a frequency-down threshold value, configure, by the frequency/voltage controller, the DP clock generation unit with the frequency-level adjustment and the DP power control unit with the voltage-level adjustment.

14. The apparatus of claim 13, wherein:

the DP clock generation unit is configured to set a new frequency level for the DP subsystem based on the frequency-level adjustment configured by the frequency/voltage controller, and the DP power control unit is configured to set a new voltage level for the DP subsystem based on the voltage-level adjustment configured by the frequency/voltage controller.

15. A method for configuration of a baseband chip, comprising:

setting, by a data plane (DP) clock generation unit of a DP subsystem, a frequency level for the DP subsystem;

setting, by a DP power control unit of the DP subsystem, a voltage level for the DP subsystem;

determining, by a DP frequency/voltage selection component of a microcontroller (uC) cluster, a frequency-level adjustment, and a voltage-level adjustment associated with a slot based on a set of inputs, the uC cluster being part of the DP subsystem;

configuring, by the DP frequency/voltage selection component of the uC cluster, the DP clock generation unit with the frequency-level adjustment; and configuring, by the DP frequency/voltage selection component of the uC cluster, the DP power control unit with the voltage-level adjustment.

16. The method of claim 15, wherein the determining, by the DP frequency/voltage selection component of the uC cluster, the frequency-level adjustment and the voltage-level adjustment associated with the slot based on the set of inputs comprises:

receiving, by a minimum frequency-table adjustment unit, a set of static and semi-static inputs from a DP controller external to the DP subsystem, the DP frequency/voltage selection component including the minimum frequency-table adjustment unit;

generating, by the minimum frequency-table adjustment unit, a minimum frequency adjustment table based on the set of static and semi-static inputs; and inputting, by the minimum frequency-table adjustment unit, the minimum frequency adjustment table into a minimum frequency-table look-up unit.

17. The method of claim 16, wherein the set of static and semi-static inputs includes one or more of a number of component carriers (CCs) associated with a grant, a maximum data throughput per slot and component carrier (CC), a slot duration per CC, an available DP subsystem frequency level, an available DP subsystem voltage level, a logical channel prioritization (LCP) processing rate, or a DP hardware cipher rate.

18. The method of claim 16, wherein the determining, by the DP frequency/voltage selection component of the uC cluster, the frequency-level adjustment and the voltage-level adjustment associated with the slot based on the set of inputs comprises:

receiving, by the minimum frequency-table look-up unit, the minimum frequency adjustment table from the minimum frequency-table adjustment unit, the DP frequency/voltage selection component including the minimum frequency-table look-up unit;

receiving, by the minimum frequency-table look-up unit, a first dynamic input from a physical layer (PHY) controller external to the DP subsystem, a second dynamic input from a logical channel prioritization (LCP) unit, and a third dynamic input from a Layer 2 parsing unit, the DP frequency/voltage selection component including the LCP unit and the Layer 2 parsing unit;

identifying, by the minimum frequency-table look-up unit, the frequency-level adjustment based on the minimum frequency adjustment table and one or more of the first dynamic input, the second dynamic input, or the third dynamic input; and inputting, by the minimum frequency-table look-up unit, the frequency-level adjustment into a frequency/voltage controller, wherein the first dynamic input includes a grant size associated with the slot, a grant duration associated with the slot, or a PHY subsystem due time for an uplink packet associated with the slot, wherein the second dynamic input includes an average-UL packet size associated with the slot, and wherein the third dynamic input includes an average-DL packet size associated with the slot.

19. The method of claim 18, wherein the determining, by the DP frequency/voltage selection component of the uC cluster, the frequency-level adjustment and the voltage-level adjustment associated with the slot based on the set of inputs comprises:

receiving, by the frequency/voltage controller, the frequency-level adjustment from the minimum frequency-table look-up unit;

in response to determining that the frequency-level adjustment meets a frequency-up threshold value or a frequency-down threshold value, identifying a voltage-level adjustment based on the frequency-level adjustment; and in response to determining that the frequency-level adjustment meets a frequency-up threshold value or a frequency-down threshold value, configure, by the frequency/voltage controller, the DP clock generation unit with the frequency-level adjustment and the DP power control unit with the voltage-level adjustment.

20. The method of claim 19, further comprising:

setting, by the DP clock generation unit, a new frequency level for the DP subsystem based on the frequency-level adjustment configured by the frequency/voltage controller, and setting, by the DP power control unit, a new voltage level for the DP subsystem based on the voltage-level adjustment configured by the frequency/voltage controller.

* * * * *